United States Patent
Ogle

(10) Patent No.: US 9,082,348 B2
(45) Date of Patent: Jul. 14, 2015

(54) METHODS AND DEVICES FOR SCROLLING A DISPLAY PAGE

(71) Applicant: Research in Motion Limited, Waterloo (CA)

(72) Inventor: Alexander John Ogle, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 223 days.

(21) Appl. No.: 13/707,650

(22) Filed: Dec. 7, 2012

(65) Prior Publication Data

US 2014/0160168 A1 Jun. 12, 2014

(51) Int. Cl.
*G09G 5/34* (2006.01)

(52) U.S. Cl.
CPC ........................................ *G09G 5/34* (2013.01)

(58) Field of Classification Search
None
See application file for complete search history.

(56) References Cited

U.S. PATENT DOCUMENTS

| | | | |
|---|---|---|---|
| 5,553,225 A | 9/1996 | Perry | |
| 7,469,381 B2 | 12/2008 | Ording | |
| 7,844,915 B2 | 11/2010 | Platzer et al. | |
| 2007/0050732 A1 | 3/2007 | Chapman, Jr. et al. | |
| 2008/0062141 A1 | 3/2008 | Chandhri | |
| 2008/0168404 A1 | 7/2008 | Ording | |
| 2011/0010659 A1* | 1/2011 | Kim et al. | 715/784 |
| 2011/0086675 A1 | 4/2011 | Brinda et al. | |
| 2011/0087997 A1 | 4/2011 | Lee et al. | |
| 2011/0090255 A1* | 4/2011 | Wilson et al. | 345/647 |
| 2011/0102455 A1* | 5/2011 | Temple | 345/619 |
| 2011/0107264 A1 | 5/2011 | Akella | |
| 2011/0193881 A1* | 8/2011 | Rydenhag | 345/647 |
| 2011/0202859 A1* | 8/2011 | Fong | 715/769 |
| 2012/0026194 A1* | 2/2012 | Wagner et al. | 345/647 |
| 2012/0072865 A1* | 3/2012 | Flake et al. | 715/786 |
| 2012/0089938 A1 | 4/2012 | Homma et al. | |
| 2013/0111397 A1* | 5/2013 | Miyoshi et al. | 715/784 |

FOREIGN PATENT DOCUMENTS

WO 2011094855 A1 8/2011

OTHER PUBLICATIONS

Anonymous: The best Cydia Tweak for Your iPhone & iPod Touch: Barrel—Add Scroll Effects to Your Homescreen!, Dec. 3, 2010, p. 1, XP054975131, retrieved from the Internet: URL: http://www.youtube.com/watch?v=BfvEG6qsCZY, *whole document* (hereinafter Cydia).*
Barrel on Cydia 4th iPod iPhone, Dec. 30, 2011, retrieved from the Internet: URL: https://www.youtube.com/watch?v=URXh8Ar7XYk.*

(Continued)

*Primary Examiner* — Maurice L McDowell, Jr.
*Assistant Examiner* — Donna J Ricks
(74) *Attorney, Agent, or Firm* — Rowand LLP

(57) ABSTRACT

Methods and devices for scrolling a display page are described. In one aspect, the present application describes a method implemented by a processor of an electronic device. The electronic device has a display and an input interface. The method includes: displaying a first portion of a display page on the display; receiving, via the input interface, a scrolling command to scroll the display page in a first direction; and, while receiving the scrolling command: determining that an edge of the display page is reached, and in response to determining that the edge of the display page is reached, maintaining the edge of the display page on the display and graphically tilting the display page inwards.

20 Claims, 5 Drawing Sheets

(56) References Cited

OTHER PUBLICATIONS

EPO, Extended European Search Report relating to application No. EP 12196006.6 dated May 7, 2013.

Anonymous: "The Best Cydia Tweak for Your iPhone & iPod Touch : Barrel—Add Scroll Effects to Your Homescreen!", Dec. 3, 2010, pp. 1-1, XP054975131, retrieved from the Internet: URL:http://www.youtube.com/watch?v=BfvEG6qsCZY [retrieved on Apr. 10, 2013] *whole document*.

Anonymous: "Nokia Photo Browser—Beta Labs", Mar. 31, 2009, pp. 1-1, XP054975132, Retrieved from the Internet: URL:http://www.youtube.com/watch?v=pV18PH5LjT4 [retrieved on Apr. 10, 2013] *whole document*.

"[Q] Bouncy scrolling—xda-developers", dated Jan. 11, 2011.

"13 things the Samsung Galaxy SIII can do you don't know about", dated Jun. 12, 2012.

"Android: Smooth List Scrolling—Java Code Geeks", dated Jun. 4, 2012.

"Auto Scroll Web Browser (ahn browser) 3.0", accessed on Oct. 19, 2012.

"Essential Graphics, Visual Indicators, and Notifications for Windows Phone", dated Sep. 25, 2012.

"Foss Patents—Apple's favorite make-Android-awkward patent (with videos)", dated Aug. 3, 2011.

"How to create an infinite scrollable list with LongListSelector", dated Oct. 1, 2012.

"Scroll-Back-and-Bounce, Apple's patent position No. 381 to break iPhone rivals", dated Aug. 9, 2011.

"Stack overflow—List view snap to item", dated Dec. 13, 2010.

"Android: The Google guide to gingerbread tips and tricks", dated Dec. 21, 2010.

* cited by examiner

METHODS AND DEVICES FOR SCROLLING A DISPLAY PAGE

TECHNICAL FIELD

The present application relates to user interface management and more particularly to methods and electronic devices for scrolling a display page of a user interface displayed on a display.

BACKGROUND

Electronic devices such as smartphones and tablet computers are equipped or associated with various input interfaces. The input interfaces provide mechanisms for inputting instructions to the electronic devices to perform associated functions. For example, the electronic devices may be equipped with navigational input devices, such as a trackball, a track pad or a touchscreen display, and/or a physical keyboard. A user may input instructions to the electronic devices by interacting with one or more of these navigational input devices to cause the electronic devices to perform the associated functions.

The instructions input to the electronic devices may be used for interacting with user interfaces of the electronic devices. Instructions may be input to navigate within the user interfaces. For example, a user interface may provide one or more display pages that may be scrolled by a user by inputting scrolling functions. Scrolling is the process of graphically moving a display page up, down, diagonally or across a display of the electronic device. By scrolling a display page, a user may access all of the content of the display page.

During a scrolling operation, a user may reach the edge of the display page. Present systems may provide a scroll bar indicator or cause an abrupt end of the scrolling operation to indicate that the edge of the display page is reached. However, such indications are not very intuitive and provide for a poor user experience to a user when navigating display pages on a user interface.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

In one aspect, the present application describes a method implemented by a processor of an electronic device. The electronic device has a display and an input interface. The method includes: displaying a first portion of a display page on the display; receiving, via the input interface, a scrolling command to scroll the display page in a first direction; and, while receiving the scrolling command: determining that an edge of the display page is reached, and in response to determining that the edge of the display page is reached, maintaining the edge of the display page on the display and graphically tilting the display page inwards.

In another aspect, the present application describes an electronic device. The electronic device includes a display, an input interface and a memory. The electronic device also includes a processor coupled with the display, the input interface and the memory. The processor is configured to: display a first portion of a display page on the display; receive, via the input interface, a scrolling command to scroll the display page in a first direction; and, while receiving the scrolling command: determine that an edge of the display page is reached, and in response to determining that the edge of the display page is reached, maintain the edge of the display page on the display and graphically tilt the display page inwards.

In yet another aspect, the present application describes a computer readable storage medium. The computer readable storage medium includes computer executable instructions which, when executed, configure a processor to: display a first portion of a display page on a display; receive, via an input interface, a scrolling command to scroll the display page in a first direction; and, while receiving the scrolling command: determine that an edge of the display page is reached, and in response to determining that the edge of the display page is reached, maintain the edge of the display page on the display and graphically tilt the display page inwards.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
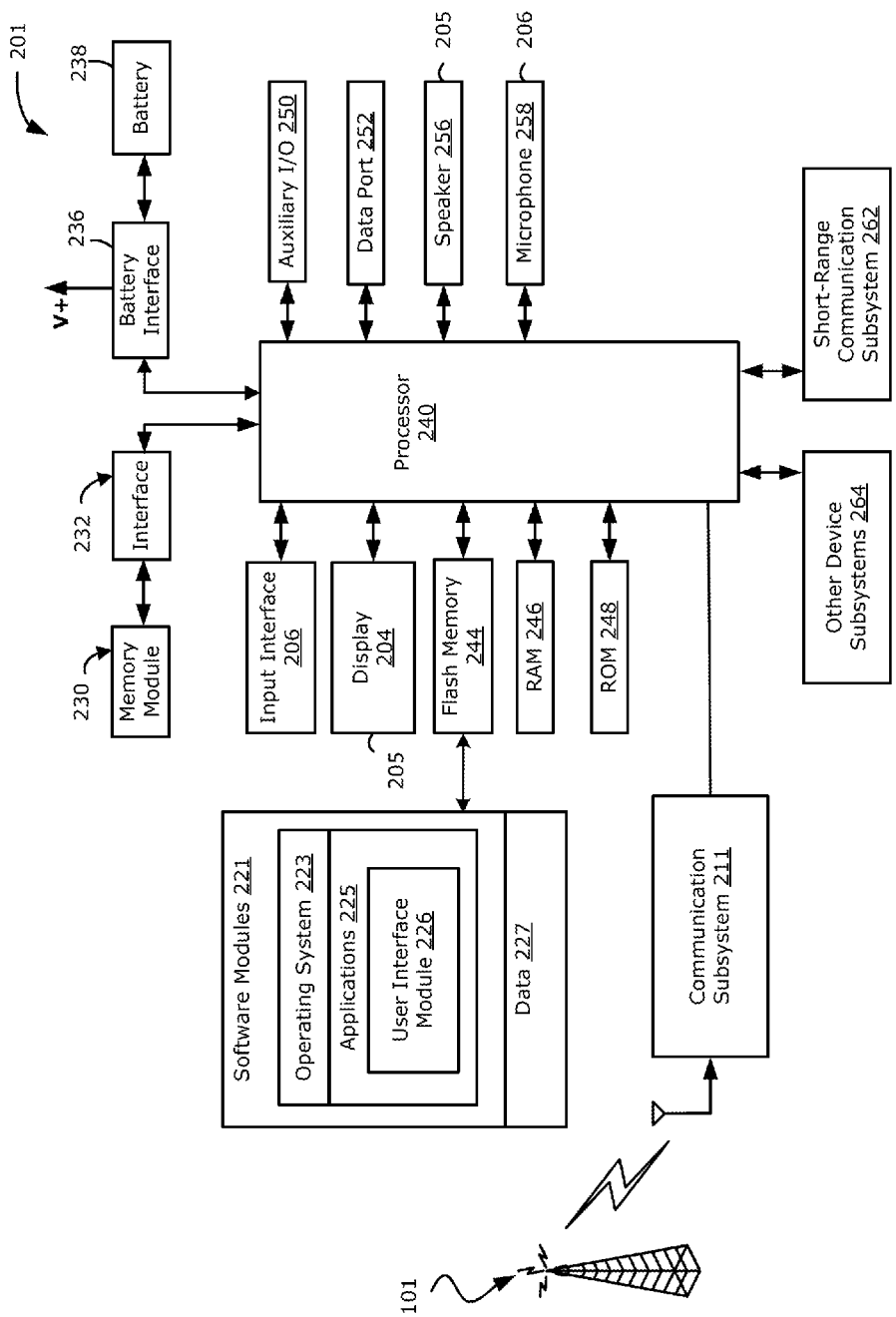
FIG. 1 is a block diagram illustrating an example electronic device.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments, the electronic device 201 may be a multiple-mode communication device configured for data and voice communications, a mobile telephone such as a smart phone, a tablet computer such as a slate computer, a wearable computer such as a watch, a PDA (personal digital assistant), or a computer system. In other example embodiments, the electronic device 201 may be of a type not specifically listed above.

The electronic device 201 includes a housing (not shown), housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. It will be appreciated that, in at least some example embodiments, the controller may, instead of or in addition to the processor 240, include an analog circuit or other types of circuits capable of performing a part or all of the functions of the processor 240 that are described herein. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces 205), a short-range communication subsystem 262, and other device subsystems generally designated as 264. Some of the subsystems shown in FIG. 1 perform communication-related functions, whereas other subsystems may provide "resident" or on-device functions.

The electronic device 201 includes a touchscreen display in this embodiment. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface and the processor 240 interacts with the touch-sensitive overlay via the electronic controller. That is, the touchscreen display acts as both an input interface 206 and an output interface 205.

The electronic device 201 is connected to a communication network such as a wireless network 101 which may include one or more of a Wireless Wide Area Network (WWAN) and a Wireless Local Area Network (WLAN) or other suitable network arrangements. In at least some example embodiments, the electronic device 201 is configured to communicate over both the WWAN and WLAN, and to roam between these networks. In at least some example embodiments, the wireless network 101 may include multiple WWANs and WLANs.

The particular design of the wireless communication subsystem 211 depends on the wireless network 101 in which the electronic device 201 is intended to operate. The electronic device 201 may send and receive communication signals over the wireless network 101 after the required network registration or activation procedures have been completed.

In at least some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (i.e. touch feedback).

In at least some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201 in order to operate in conjunction with the wireless network 101.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that control basic device operations, including data and possibly voice communication applications may be installed on the electronic device 201 during or after manufacture. Additional applications and/or upgrades to an operating system 223 or software applications 225 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

The processor 240 operates under stored program control and executes software modules 221 stored in memory such as persistent memory, for example, in the flash memory 244. As illustrated in FIG. 1, the software modules 221 include operating system software 223, and other software applications 225 including the user interface module 226. In the example embodiment of FIG. 1, the user interface module 226 is implemented as a separate stand-alone application 225, but in other example embodiments, the user interface module 226 may be implemented as part of the operating system 223 or another application 225.

The electronic device 201 may include a range of additional software applications 225, including, for example, a notepad application, a contact records application (which may perform the functions of an address book and allows contact records to be created and stored), a calendar application (which may allow event records to be created and stored), a mapping application, or a media player application, or any combination thereof. Each of the software applications 225 may include layout information defining the placement of particular fields and graphic elements (for example, text fields, input fields, icons, etc.) in a graphical user interface (GUI) associated with the application. A GUI is a type of user interface that allows the user to interact with a device and/or an application utilizing images, icons, text and other selectable graphical elements. The GUI represents information and actions available to the user through graphical icons and visual indicators. The software applications 225 may also include information to navigate within the GUI associated with the software application 225. The information may define GUI specific user input instructions to perform various navigation functions and features within the GUI. For example, a user may input a particular instruction via the input interface 206 (for example, a swiping gesture on a touchscreen display) of the electronic device 201 to perform a scrolling function on a display page provided by the GUI.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

The user interface module 226 provides a platform for a user to interact with one or more software application 225. For example, the user interface module 226 may provide a GUI for one or more associated software applications 225. The user interface module 226 may enable a user to execute the various functions and features of the associated one or more software applications 225.

In at least some example embodiments, the user interface module 226 may include information for navigating within the associated one or more software applications 225. For example, the user interface module 226 may receive a navigation instruction from a user of the electronic device (for example, via the input interface 206), and in response to receiving the navigation instruction, perform the corresponding navigational function and feature within the associated software application 225. The user interface module 226 may display a display page associated with the software application 225 (for example, the user interface module 226 may display a display page of a contact record for a contact manager application), and in response to receiving a navigation instruction, perform the corresponding navigational function and feature within the display page. In at least some example embodiments, the navigational functions and features performed on the display page may include a scrolling function (i.e. graphically moving the display page up, down, diagonally or across the display 204 to display other portions of the display page), a zooming in function (graphically magnifying the display page to display a portion of the display page magnified), and/or a zooming out function (graphically shrinking the display page to display more or all of the portions of the display page). It will be appreciated that other navigational functions and features may be performed on the display page by the user interface module 226.

In at least some example embodiments, the user interface module 226 may not allow a scrolling function to be performed when the edge of the display page is reached. For example, the display page on the display may not include any other portions in the particular scrolling direction (i.e. the edge of the display page is reached). The user interface module 226 may instead provide an indication that the edge of the display page is reached. For example, in such example embodiments, the user interface module 226 may display a first portion of a display page on the display 204 and receive, via the input interface 206, a scrolling command to scroll the display page in a first direction. While receiving the scrolling command, the user interface module 226 may determine if the edge of the display page is reached, and when the edge of the display page is reached, maintain the edge of the display page on the display and graphically tilt a remainder of the first portion of the display page inwards. Accordingly, by maintaining the edge of the display page on the display and graphically tilting the remainder of the first portion of the display page inwards, the user interface module 226 provides an indication to the user that the edge of the display page is reached.

In at least some example embodiments, while receiving the scrolling command, the user interface module 226 may further detect an increase in duration of the scrolling command, and in response to detecting the increase in the duration of the scrolling command, increase the degree of tilting of the remainder of the first portion of the display page inwards. For example, if the scrolling command is a swiping gesture being received from a user via a touchscreen display, and the edge of the display page is reached; further swiping by the user as part of scrolling command, may cause an increase in the degree of tilting of the remainder of the first portion of the display page inwards. Alternatively, instead of "further swiping" being indicative of increased duration of the scrolling command, the increased duration may be indicated by continued touch contact (i.e. lack of a detected "end" or "release" of the touchscreen swipe input). That is, as long as the user continues to make contact with the touchscreen display, the scrolling command is considered to be ongoing until either the contact is released or the user swipes in a different (e.g. opposite) direction.

Additionally, in at least some example embodiments, while receiving the scrolling command, the user interface module 226 may determine if the duration of the scrolling command is greater than a pre-determined threshold, and when the duration of the scrolling command is greater than the pre-determined threshold, the user interface module 226 may display a zoomed out display page. For example, if the scrolling command is a swiping gesture being received from a user via a touchscreen display, and the edge of the display page is reached; further swiping by the user as part of the scrolling command (or lack of a detected "end" of the swiping command) may further increase the degree of tilting of the remainder of the first portion display page and may eventually no longer display a graphically tiled display page and instead, display a zoomed out display page. Navigational functions and features may then be performed on the zoomed out display page. For example, the zoomed out display page may be zoomed in and/or scrolled or further zoomed out (if the display page is not completely zoomed out).

In one sense, the display page may appear "hinged" along the edge shown in the display 204 insofar as scrolling/swiping commands cause the display page to swing inwards into the display 204 as though hinged along the displayed edge.

In at least some example embodiments, the user interface module 226 may detect a termination of the scrolling command, and in response to detecting the termination of the scrolling command, display the display page untilted. For example, if the scrolling command is a swiping gesture being received from a user via a touchscreen display and the user ends the swiping gesture (i.e. the scrolling command terminates), the user interface module 226 no longer displays a graphically tilted remainder of the first portion of the display page and instead, displays the display page untilted. For example, the user interface module 226 may return the display page to the state prior to graphically tilting the remainder of the first portion of the display page (e.g. the first portion of the display page is again displayed).

Specific functions and features of the user interface module 226 will be discussed in greater detail below with reference to FIGS. 2 and 3.

In at least some example embodiments, the operating system 223 may perform some or all of the functions of the user interface module 226. In other example embodiments, the functions or a portion of the functions of the user interface module 226 may be performed by one or more other applications. Further, while the user interface module 226 has been illustrated as a single block, the user interface module 226 may include a plurality of software modules. In at least some example embodiments, these software modules may be divided among multiple applications.

Scrolling a Display Page

Figure 2:
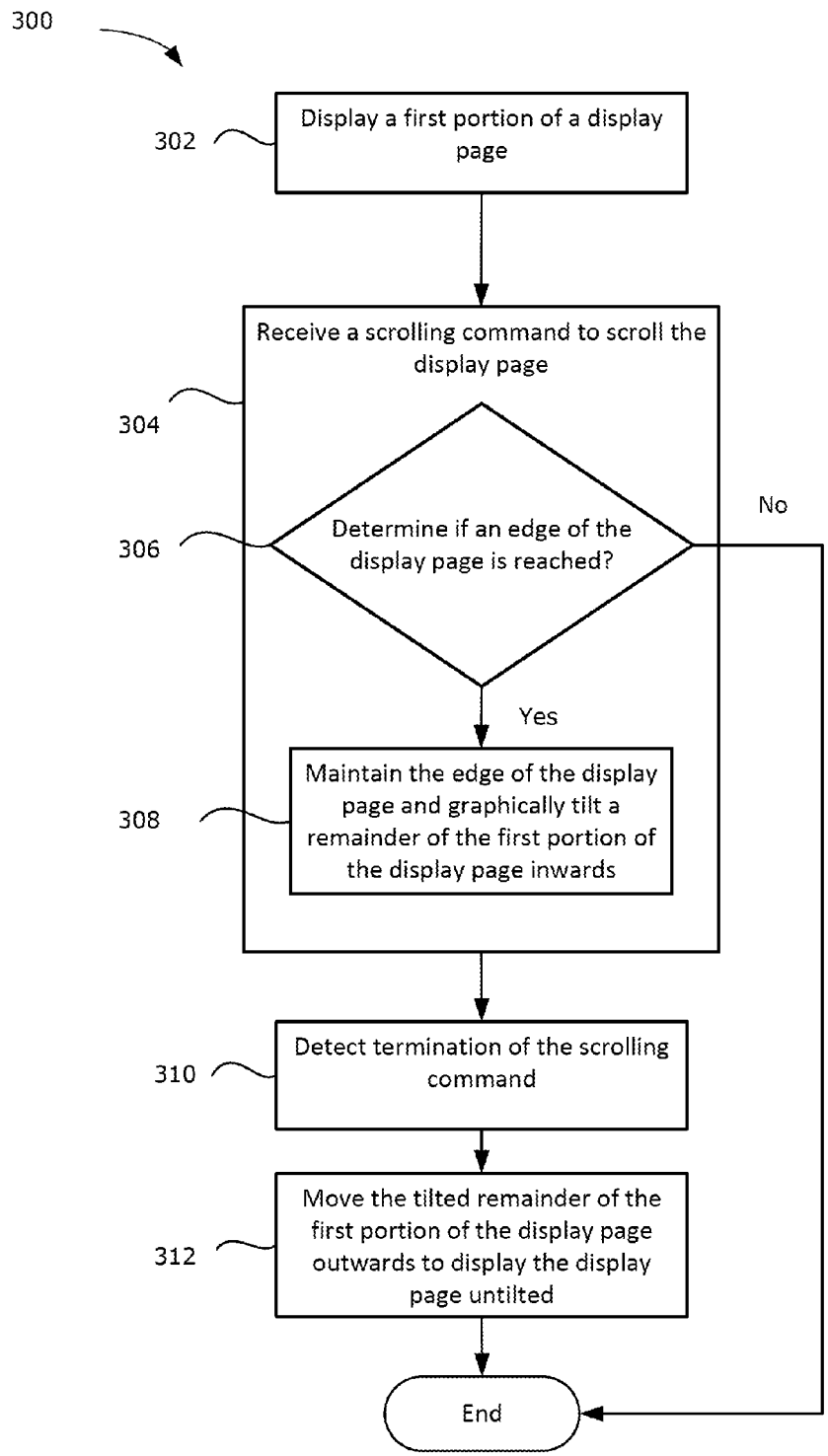
FIG. 2 is a flowchart illustrating an example method of scrolling a display page.

Referring now to FIG. 2, a flowchart of an example method 300 of scrolling a display page is illustrated. The electronic device 201 (FIG. 1) may be configured to perform the method 300 of FIG. 2. In at least some example embodiments, the processor 240 (FIG. 1) of the electronic device 201 is configured to perform the method 300 of FIG. 2. One or more applications 225 (FIG. 1) or modules on the electronic device 201 may contain computer readable instructions which cause the processor 240 of the electronic device 201 to perform the method 300 of FIG. 2. In at least some example embodiments, the user interface module 226 (FIG. 1) stored in memory of the electronic device 201 is configured to perform the method 300 of FIG. 2. More particularly, the user interface module 226 may contain computer readable instructions which, when executed, cause the processor 240 to perform the method 300 of FIG. 2. It will be appreciated that the method 300 of FIG. 2 may, in at least some example embodiments, be provided by other software applications 225 or modules apart from those specifically discussed above, such as the operating system 223 (FIG. 1). Accordingly, any features which are referred to as being performed by the electronic device 201 may be performed by any one or more of the software applications 225 or modules referred to above or other software modules.

In at least some example embodiments, at least some of the method 300 of FIG. 2 may be performed by or may rely on other applications 225 or modules which interface with the user interface module 226. For example, the user interface module 226 may be equipped with an application programming interface (API) which allows other software applications 225 or modules to access features of the user interface module 226.

The method 300 includes, at 302, the electronic device 201 displaying a first portion of a display page on the display 204 (FIG. 1). For example, an application 225 may be accessed on the electronic device 201, and content for the associated application 225 is displayed on the display page. For example, the content displayed on the display page may include a list or tiled page of thumbnails of images for an image application, a contact list for a contact manager application, a word document for a word processor application, a webpage for a web browser application, an email message for an email application, etc. It will be appreciated that the content displayed on the display page may include any type of content depending on the associated application 225 being accessed on the electronic device 201.

The display page includes at least a first portion. For example, in at least some example embodiments, the first portion may display all of the content. That is, the display page may only include a first portion which displays all of the content. A user may view all of the content on the displayed first portion of the display page. However, in at least some example embodiments, the display page may include a plurality of portions, such as, a first portion and a second portion. In such example embodiments, the plurality of portions may not be simultaneously displayed on the display 204, at least at the current zoom magnification. For example, the display page may only display a part of the display page on the display 204. A user may need to scroll the display page to move between the first portion and the second portion in order to access all of the content of the display page.

At 304, the electronic device 201 may receive, via the input interface 206, a scrolling command to scroll the display page in a first direction. That is, the electronic device 201 receives a navigation instruction for graphically moving the display page in a first direction on the display 204 of the electronic device 201. The first direction may be any direction of movement of the display page on the display 204 (for example, an upward, downward, diagonal or cross movement of the display page on the display 204).

The scrolling instruction may be received, for example, from an input interface 206 associated with the electronic device 201. For example, the instruction may be received from a navigational input device such as a trackball, track pad, touchscreen display and/or key pad or keyboard. In at least some example embodiments, the scrolling instruction may be a swiping gesture on a touchscreen display of the electronic device 201. That is, a user may perform a swiping gesture on a touchscreen display to input the scrolling instruction to scroll the display page in the first direction. The swiping gesture may be a swipe in a direction opposite to the first direction.

While receiving the first scrolling command, the electronic device 201, at 306, may determine if an edge of the display page is reached. That is, the electronic device 201 may check if one of the edges of the display page has been scrolled onto the display 204. For example, in at least some example embodiments, the electronic device 201 may determine that the edge of the display page is reached when the display page is not capable of being graphically scrolled. For example, if the display page only includes a first portion which displays all of the content, the electronic device 201 may determine that the edge of the display page is reached when the first portion is displayed as the display page may not be further graphically scrolled.

However, in at least some example embodiments, when the display page includes a plurality of portions, such as a first portion and a second portion, the display page may be capable of being further graphically scrolled. For example, while receiving the scrolling command, the electronic device 201 may, instead, graphically scroll the display page in the first direction to display the second portion of the display page on the display 204. That is, the display page is graphically moved to display the second portion from the first portion. In such example embodiments, when the first portion is being displayed, the electronic device 201 may determine that the edge of the display page is not reached (for example, as the display page may be further scrolled in the first direction). When the second portion of the display page is displayed, the electronic device 201 may then determine that the edge of the display page is reached (for example, as the display page may not be further scrolled in the first direction). It will be appreciated that the detection or determination of whether an edge of the display page has been reached may involve determining from a pointer to a location in the display page from the respective axis of the display 204 and the display page whether an edge of the display page in the first direction is within the display. In such example embodiments, the scrollable portion of the display page may be within a window in a larger display frame shown in the display 204, in which case the electronic device 201 determines if the edge of the display page is now visible in the window.

In response to determining that the edge of the display page is reached, the electronic device 201, at 308, may maintain the edge of the display page and graphically tilt a remainder of the first portion of the display page inwards. That is, the edge of the display page is maintained at a fixed position while the remainder of the first portion of the display page is graphically tilted inwards. For example, in at least some example embodiments, graphically tilting a remainder of the first portion of the display page includes pivoting the remainder of the first portion of the display page around the edge of the display page. That is, the edge of the display page is a stationary portion with the remainder of the first portion of the display page pivoting inwards about the stationary edge of the display page. Accordingly, a hinge mechanism is formed with the edge of the display page being the fixed portion and the remainder of the first portion of the display page swinging inwards around the fixed edge of the display page.

It will be appreciated that the edge of the display page may depend on the direction of scrolling of the display page. For example, if the first direction of scrolling is an upwards direction (which may be caused using a downward swipe scrolling command, in some embodiments), the edge of the display page will be a top portion of the display page. In such example embodiments, when the edge of the display page is determined to be reached, the remainder of the first portion of the display page will be tilted inwards around the fixed top portion of the display page. Similarly, in at least some example embodiments, if the first direction of scrolling is a downward direction, the edge of the display page will be a bottom portion of the display page. In such example embodiments, when the edge of the display page is determined to be reached, the remainder of the first portion of the display page will be tilted inwards around the fixed bottom portion of the display page. Similarly, in at least some example embodiments, if the first direction of scrolling is in a cross direction (i.e. across the display 204), the edge of the display page will be a side portion of the display page. In such example embodiments, when the edge of the display page is determined to be reached, the remainder of the first portion of the display page will be tilted inwards around the fixed side portion of the display page.

In at least some example embodiments, when the display page includes a plurality of portions, such as a first portion and a second portion, in determining that the edge of the display page is reached, the electronic device 201 may further graphically tilt a remainder of the second portion of the display page. For example, if the display page is graphically scrolled from the first portion to the second portion, and the edge of the display page is determined to be reached (which may be the bottom portion of the second portion of the display page), the edge of the display page is maintained and the remainder of the second portion of the display page is graphically tilted inwards.

However, in at least some example embodiments, when the display page includes a plurality of portions, such as a first portion and a second portion, and the edge of the display page is determined to be reached when the first portion of the display page is displayed (i.e. the direction of scrolling is not in a direction that graphically moves the display page from the first portion to the second portion, and the edge of the display page may be the top portion of the first portion of the display page); the electronic device 201 in graphically tilting a remainder of the first portion of the display page, may also display the second portion of the display page on the display 204 tilted. That is, the remainder of the first portion and the second portion are displayed tilted inwards around the edge of the display page. By pivoting the remainder of the first portion of the display page around the fixed edge of the display page, the second portion of the display page is also pivoted around the fixed edge of the display page. That is, the second portion swings inwards with the remainder of the first portion around the fixed edge of the display page. Accordingly, the remainder of the first portion and the second portion are displayed graphically tilted inwards.

It should be noted that the terms "first portion" and "second portion" are used to refer to different portions of an overall page or list. The scrolling transition between the first portion and the second portion in most embodiments is a smooth one in which parts of both portions are visible in the display as the page scrolls. It is not intended to suggest that the transition from the first portion to the second portion is abrupt, like a page turn.

At 310, the electronic device 201 may detect termination of the scrolling command. That is, the electronic device 201 may detect that input of the scrolling command ends. For example, if the scrolling command is a swiping gesture being received from a user via a touchscreen display of the electronic device 201, and the user ends the swiping gesture, by for example, no longer touching the touchscreen display, the electronic device 201 may detect termination of the scrolling command. In at least some example embodiments, the electronic device 201 may continuously receive the scrolling command when a user performs a continuous swiping gesture in the same direction and/or maintains continuous contact on the touchscreen display, and may detect termination of the scrolling command when the user stops the swiping gesture, releases contact of the touchscreen display, or reverses the gesture to swipe in the opposite direction.

In response to detecting termination of the scrolling command, the electronic device 201, at 312, may display the display page untilted. That is, the graphically tilted remainder of the first portion of the display page is no longer displayed and, instead, the display page is displayed untilted. For example, the electronic device 201 may return to displaying the portion of the display page that includes the edge of the display page, which is displayed prior to graphically tilting the remainder of the first portion of the display page. For example, the first portion of the display page may be again displayed (or, in at least some example embodiments, the second portion of the display page may be displayed if the display page includes a first portion and a second portion). The display page may "snap back" to an untilted view, in some embodiments. The display page may "swing back" to the untilted position is some other embodiments.

Figure 3:
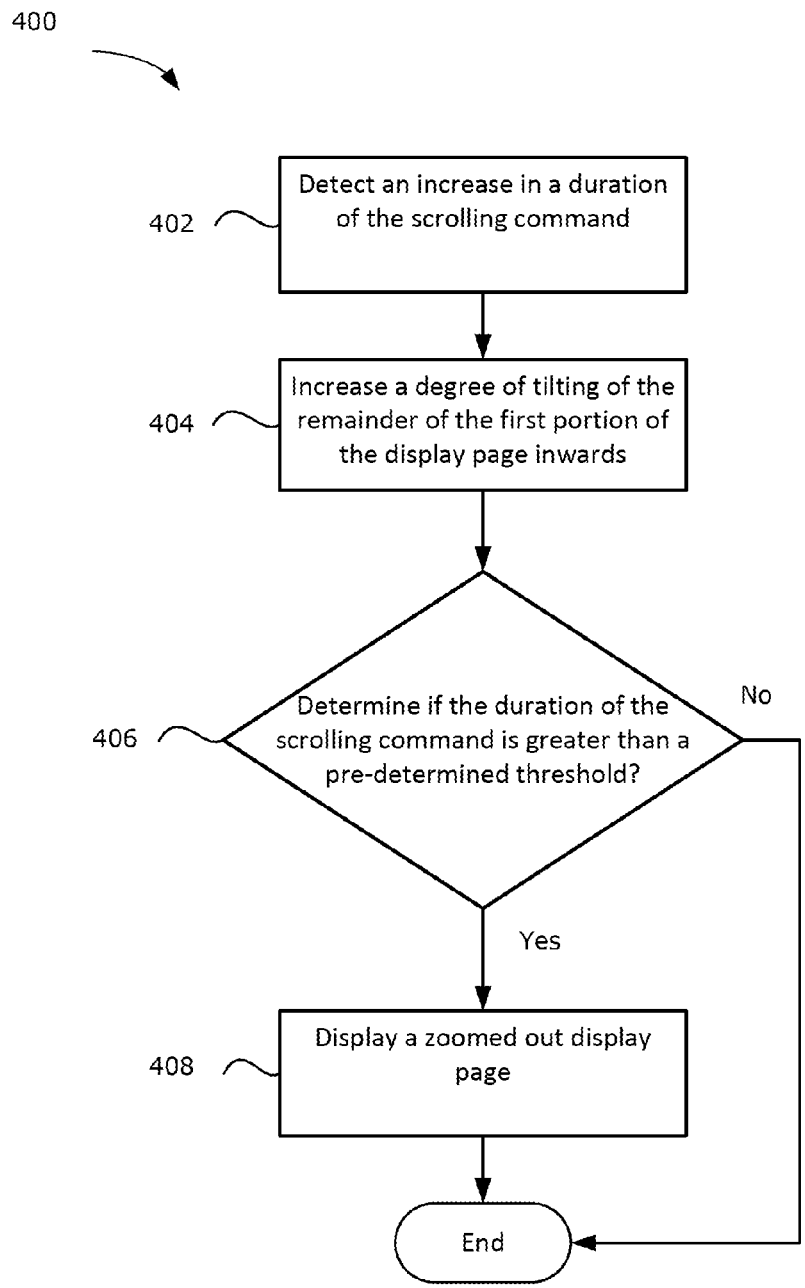
FIG. 3 is a flowchart illustrating another example method of scrolling a display page.

Referring now to FIG. 3, a flowchart of another example method of scrolling a display page is illustrated. The electronic device 201 (FIG. 1) may be configured to perform the method 400 of FIG. 3. In at least some example embodiments, the processor 240 (FIG. 1) of the electronic device 201 is configured to perform the method 400 of FIG. 3. One or more applications 225 (FIG. 1) or modules on the electronic device 201 may contain computer readable instructions which cause the processor 240 of the electronic device 201 to perform the method 400 of FIG. 3. In at least some example embodiments, the user interface module 226 (FIG. 1) stored in memory of the electronic device 201 is configured to perform the method 400 of FIG. 3. More particularly, the user interface module 226 may contain computer readable instructions which, when executed, cause the processor 240 to perform the method 400 of FIG. 3. It will be appreciated that the method 400 of FIG. 3 may, in at least some example embodiments, be provided by other software applications 225 or modules apart from those specifically discussed above, such as the operating system 223 (FIG. 1). Accordingly, any features which are referred to as being performed by the electronic device 201 may be performed by any one or more of the software applications 225 or modules referred to above or other software modules.

In at least some example embodiments, at least some of the method 400 of FIG. 3 may be performed by or may rely on other applications 225 or modules which interface with the user interface module 226. For example, the user interface module 226 may be equipped with an application programming interface (API) which allows other software applications 225 or modules to access features of the user interface module 226.

In at least some example embodiments, the method 400 may be performed within 304 (i.e. during receipt of a scrolling command) and after 308 of method 300 of FIG. 3.

The method 400 includes, at 402, detecting an increase in duration of a scrolling command. That is, the electronic device 201 detects an increase in the length of time of the scrolling command. For example, as mentioned above, the method 400 may be performed within 304 and after 308 of method 300 of FIG. 3. Accordingly, while receiving the scrolling command, the electronic device 201 may detect an increase in the length of time of receiving the scrolling command, and such detection is performed after the edge of the display page is determined to be reached. For example, in at least some example embodiments, the scrolling command may be a swiping gesture being received from a user via a touchscreen display of the electronic device 201. When the edge of the display is reached, further continuous swiping (i.e. swiping without breaking contact with the touchscreen display) by the user may be detected as an increase in duration of the scrolling command by the electronic device 201. Alternatively, maintaining contact with the touchscreen display may be detected as an increase in duration of the scrolling command even without continued swiping movement in some embodiments.

In response to detecting an increase in the duration of the scrolling command, the electronic device 201, at 404, may increase the degree of tilting of the remainder of the first portion of the display page inwards. That is, after the length of time of the scrolling command is increased, the degree of inward tilting of the remainder of the first portion is increased so that the remainder of the first portion is tilted further inwards than when the edge of the display page is first determined. In at least some example embodiments, the degree of tilting may be proportional to the duration of the scrolling command. That is, detecting a longer duration of the scrolling command may cause a further degree of inward tilting of the remainder of the first portion than when detecting a shorter duration of the command. For example, in at least some example embodiments, the scrolling command may be a swiping gesture being received from a user via a touchscreen display of the electronic device 201. When the edge of the display page is reached, further continuous swiping by the user may be detected and cause the remainder of the first portion to further tilt inwards. In such example embodiments, a longer duration of continuous swiping by the user may cause the remainder of the first portion to tilt more inwards than a shorter duration of continuous swiping. That is, the degree of tilting is varied by the length of time of swiping by the user.

In at least some example embodiments, an increase in the "distance" swiped for a scrolling command may, in addition to or instead of an increase in the duration of the scrolling command, may increase the degree of tilting of the remainder of the first portion of the display page inwards. For example, in at least some example embodiments, the scrolling command may be a swiping gesture being received from a user via a touchscreen display of the electronic device 201. In such example embodiments, when the edge of the display page is reached, an increase in the "distance" of swiping (i.e. an increase in the length of contact covered during the swiping gesture), may proportionally increase the degree of tilting of the remainder of the first portion of the display page inwards. Accordingly, the degree of tilting may be changed by the "distance" of swiping on the touchscreen display by the user.

At 406, the electronic device 201 may determine if the duration of the scrolling command is greater than a pre-determined threshold. That is, the electronic device 201 may compare the length of time of the scrolling command to a pre-determined threshold to check if the length of time of the scrolling command is greater than the pre-determined threshold. For example, if the scrolling command is a swiping gesture being receiving from a user via a touchscreen display of the electronic device 201, and when the edge of the display is reached, further continuous swiping by the user may cause the remainder of the first portion of the display page to further tilt inwards; then this length of time of swiping by the user is compared to a pre-determined threshold to check if it is greater than the pre-determined threshold.

When the duration of the scrolling command is greater than the pre-determined threshold, the electronic device 201, at 408, may display a zoomed out display page. That is, when the length of time of the scrolling command is determined to be greater than the pre-determined threshold, the tilted remainder of the first portion is no longer displayed, and instead, the display page is displayed zoomed out. For example, if the scrolling command is a swiping gesture being receiving from a user via a touchscreen display of the electronic device 201, and when the edge of the display page is reached, further continuous swiping by the user may cause the remainder of the first portion of the display page to further tilt inwards until a threshold point is reached. That is, the electronic device 201 may check if the length of time of swiping is greater than the pre-determined threshold and when the length of time of swiping is greater than the pre-determined threshold, the remainder of the first portion of the display page tilted inwards may no longer be displayed and instead, a zoomed display page is displayed. Accordingly, the user may only continuously swipe for a certain length of time (which is based on the pre-determined threshold) prior to the electronic device 201 changing the display page from a tilted remainder of the first portion to a zoomed out display page. Similarly, the remainder of the first portion of the display page may only be tilted to a particular maximum degree (which is based on the pre-determined threshold), prior to a zoomed out display page being displayed. The transition from tilted to zoomed out may be rendered graphically as a "breaking away" of the displayed (hinged) edge of the display page.

The pre-determined threshold may be a fixed value (i.e. it may not be changed). However, in at least some example embodiments, the pre-determined threshold may be varied (i.e. it may be changed). For example, in at least some example embodiments, the pre-determined threshold may be based on applying one or more historical preferences. The one or more historical preferences may be determined based on previous patterns of usage of the electronic device. For example, information of a user's previous scrolling patterns may be collected and analyzed to determine a historical preference. For example, if the scrolling command is a swiping gesture on a touchscreen display of the electronic device 201, the electronic device 201 may collect information related to the length of time of previous continuous swiping gestures in order to determine a historical preference. This information may be continuously collected and used to update the historical preference. Accordingly, in at least some example embodiments, the pre-determined threshold may be set based on a historical preference related to the length of time of previous continuous swiping gestures. For example, if a user of the electronic device 201 historically performs continuously short swiping gestures when the edge of the display page is reached, the pre-determined threshold may be set at a lower value (i.e. a shorter continuous swiping gesture may be required in order to change from a tilted remainder of a first portion of a display to a zoomed out display page). While, if a user of the electronic device 201 historically performs continuously long swiping gestures when the edge of the display page is reached, the pre-determined threshold may be set at a higher value (i.e. a longer continuous swiping gesture may be required in order to change from a tilted remainder of a first portion of a display to a zoomed out display page). It will be appreciated that the historical preferences may be determined based on other or a combination of different types of previous patterns of usage of the electronic device 201.

In at least some example embodiments, the zoomed out display page may display all of the portions of the display page. That is, the zoomed out display page may be a graphically shrunk version of the display page that displays all of the portions of the display page on the display 204. For example, if the display page includes a first portion and a second portion, the zoomed out display page displays the first portion and the second portion on the display 204. Accordingly, a user of the electronic device 201 may view the first portion and the second portion (and all of the associated content within the first portion and the second portion) simultaneously on the display 204, without the need for further scrolling.

In at least some other example embodiments, the zoomed out display page may not display all of the portions of the display page. Rather, the zoomed out display page may display more of the portions of the display page than when only an unzoomed out portion of the display page is displayed. For example, if the display page includes a first portion, a second portion and a third portion, the zoomed out display page may display the first portion and the second portion but not the third portion on the display 204. In such example embodiments, the zoomed out display page may need to be further scrolled to display the third portion of the display page.

As the zoomed out display page may be a graphically shrunk version of the display page that displays all of the portions of the display page on the display 204, the content within these portions may also be reduced in size. For example, the pixel size of the content within the zoomed out display page may be reduced in comparison to the content when only the first portion or the second portion of the display page is displayed. Accordingly, in at least some example embodiments, the electronic device 201 may insert one or more identifiers to the content of the zoomed out display page to indicate one or more sections within the content of the zoomed out display page. That is, the electronic device 201 adds one or more identifiers to the content of the zoomed out display page to identify sections for the content of the zoomed out display page.

For example, in at least some example embodiments, the display page may include an alphabetical list (such as, an alphabetical list of contacts when a contact manager application is accessed). For example, the alphabetical list is within the content of the zoomed out display page. The zoomed out display page may display the full alphabetical list on the display 204 or a portion of the full list. In either case, the text of individual entries may be too small to read reliably. In such example embodiments, the electronic device 201 may insert identifiers to the alphabetical list of the zoomed out display page that include letters indicating alphabetical sections of the list. For example, the identifier letter "A" may be added to section all of the items (for example, contact names) within the list associated with the letter "A" (for example, contact names starting with the letter "A"), the identifier letter "B" may be added to section all of the items (for example, contact names) within the list associated with the letter "B" (for example, contact names starting with the letter "B"). Accordingly, a user viewing the alphabetical list in the zoomed out display page, may identify sections for the alphabetical list based on the identifiers. The inserted identifiers may be temporary and may be removed by the electronic device 201 when the zoomed out display page is further navigated (for example, zoomed in).

As mentioned above, the zoomed out display page may be further navigated. For example, the zoomed out display page may be zoomed in. That is, a portion of the zoomed out display page may be magnified and displayed on the display 204. In at least some example embodiments, the zoomed out display page may be scrolled or further zoomed out (for example, if the zoomed out display page does not display all of the portions of the displayed page).

Example Display Page

Figure 5:
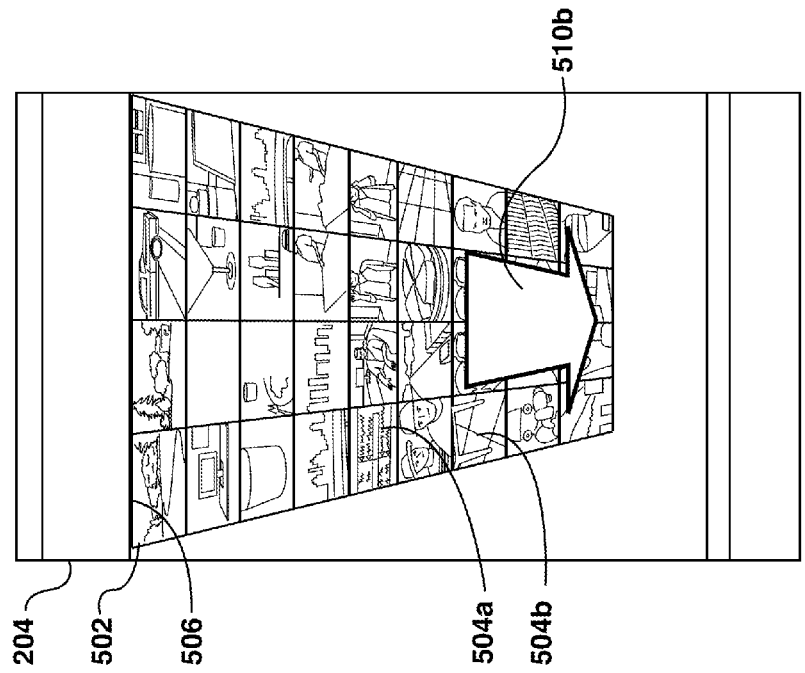
FIG. 5 shows the example display page of FIG. 4 tilted inwards in response to a scrolling command.
Figure 4:
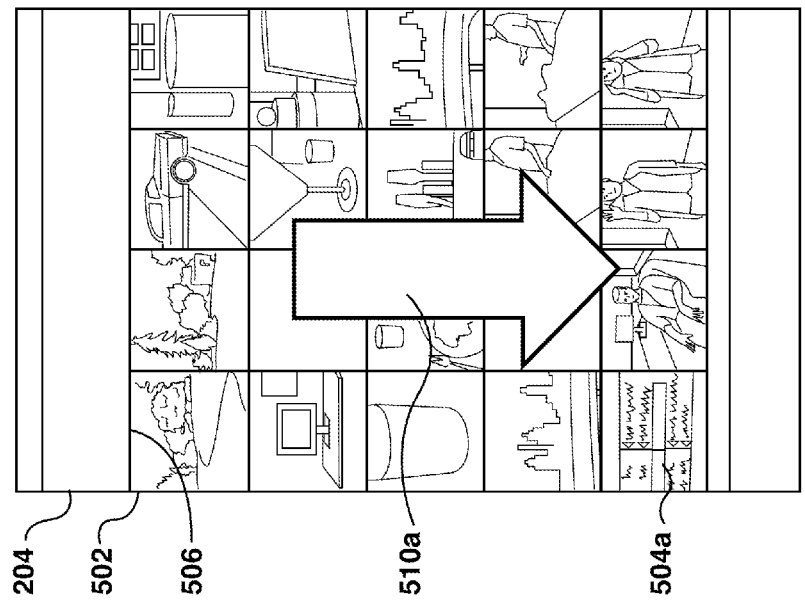
FIG. 4 is an example embodiment of an example display page.
Figure 6:
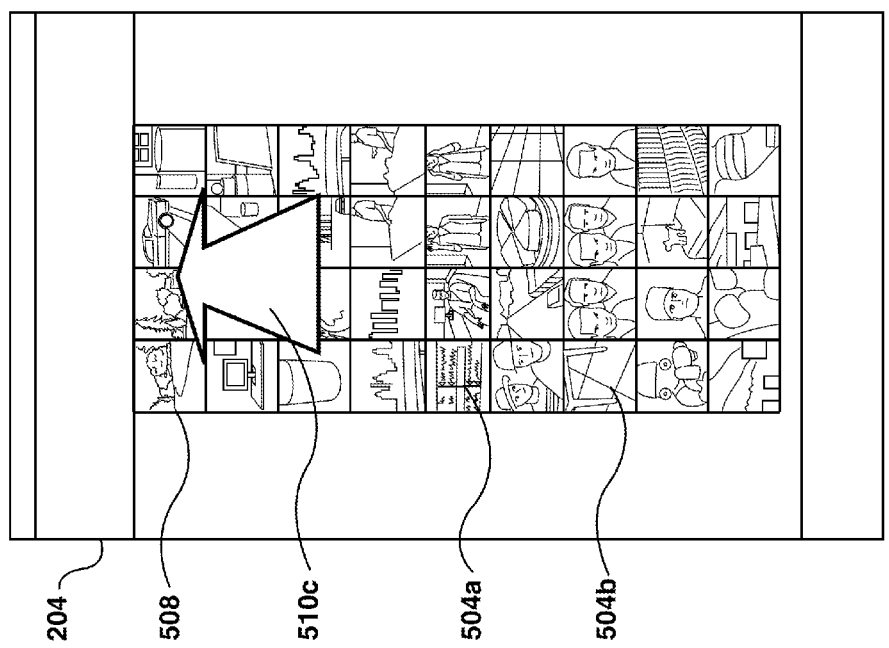
FIG. 6 shows the example display page of FIG. 4 in a zoomed out state in response to the scrolling command exceeding a threshold duration.

Reference is next made to FIGS. 4 to 6 which show an example embodiment of a display page on the display 204 of the electronic device 201. More particularly, FIGS. 4 to 6 may illustrate the display page at various operations of method 300 of FIG. 2 and method 400 of FIG. 3.

Referring first to FIG. 4 which shows an example embodiment of an example display page 502 on the display 204 of the electronic device 201. The display page 502 may be provided by a user interface (e.g. a GUI) for one or more associated applications 225 (FIG. 1). In the illustrated example of FIG. 4, the display page 502 may be provided by a user interface for an image application (for example, as the display page 502 includes a tiled page of images). The display page 502 includes a first portion 504a that is displayed on the display 204. The display page 502 also includes a second portion 504b (shown in FIG. 5) which is not displayed on the display 204. The display page 502 includes the edge 506 of the display page 502 (i.e. the top part of the first portion 504a of the display page 502). In the example embodiment, the electronic device 201 receives, via an input interface 206 (FIG. 1), a scrolling command to scroll the display page 502 in a first direction (i.e. in an upwards direction; the downward arrow 510a indicates a downward swiping gesture that corresponds to an upwards scrolling command). The scrolling command may, for example, be a downward swiping gesture performed by a user on a touchscreen display displaying the display page 502. The downward swiping gesture may be a command to scroll the display page 502 in an upward direction. While receiving such a scrolling command, the electronic device 201 may determine that the edge 506 of the display page 502 is reached, and in response to determining that the edge 506 of the display page 502 is reached, the electronic device 201 maintains the edge 506 of the display page 502 on the display 204 and graphically tilts a remainder of the first portion 504a of the display page 502 inwards, as illustrated, for example, in FIG. 5.

However, in this example, if the electronic device 201 receives a scrolling command to scroll the display page 502 in a downward direction (not illustrated), the electronic device 201 may scroll the display page 502 to display the second portion 504b of the display page 502 and then may determine that the edge of the display page 502 is reached. In such example embodiments, in response to determining that the edge of the display page 502 (which is the now the bottom part of the second portion 504b of the display page 502) is reached, the electronic device 201 maintains the edge of the display page 502 on the display 204 and graphically tilts a remainder of the second portion 504b of the display page 502 inwards.

Reference is next made to FIG. 5, which shows the example display page 502 of FIG. 4 tilted inwards. In the illustrated example of FIG. 5, the edge 506 of the display page 502 is maintained and the remainder of the first portion 504a of the display page 502 is graphically tilted inwards. The second portion 504b of the display page 502 (which is below the first portion 504a of the display page 502) is also shown to be graphically tilted inwards since the tilting of the display page 502 makes it possible to see more of the display page 502 on the display 204. For example, the remainder of the first portion 504a and the second portion 504b of the display page 502 are pivoted inwards around the fixed edge 506 of the display page 502 (as illustrated by the inwards arrow 510b). In this manner, a user of the electronic device 201 viewing the display page 502 is given the indication that the edge 506 of the display page 502 is reached.

In at least some example embodiments, while receiving the scrolling command (for example, a downward swiping gesture), the electronic device 201 may detect an increase in duration of the scrolling command (for example, further continuous downward swiping on the display page 502 shown in FIG. 5), and in response to detecting the increase in the duration of the scrolling command, increasing the degree of tilting of the remainder of the first portion 504a and the second portion 504b of the display page 502 inwards. The electronic device 201 may further determine if the duration of the scrolling command is greater than a pre-determined threshold (for example, if the length of time of the downward swiping is greater than a pre-determined threshold), and in response to determining that the duration of the scrolling command is greater than the pre-determined threshold, display a zoomed out display page (that is, a zoomed out display page is displayed instead of, for example, the graphically tilted remainder of the first portion 504a and the second portion 504b of the display page, as illustrated, in FIG. 6).

Reference is now made to FIG. 6, which shows the example display page 502 of FIG. 4 in a zoomed out view. In the illustrated example of FIG. 6, the example display page is a zoomed out display page 508. The zoomed out display page 508 may be a magnification of the display page 502. In the illustrated example of FIG. 6, the formerly fixed or hinged edge 506 of the display page 502 is "snapped off" to form the zoomed out display page 508. For example, as the remainder of the first portion 504a and the second portion 504b are graphically tilted as shown in FIG. 5, the "snapping off" of the formerly fixed or hinged edge 506 of the display page 502 in the upward and inward direction (as shown by the upward and inward arrow 510c) transforms the display page 502 to a zoomed out display page 508. The zoomed out display page 508 includes the first portion 504a and the second portion 504b that are displayed on the display 204. Accordingly, a user may view all of the content of the display page on the display 204.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus and articles of manufacture also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of an electronic device, the electronic device having a display and an input interface, the method comprising:
displaying a first portion of a display page on the display;
receiving, via the input interface, a scrolling command to scroll the display page in a first direction; and, while receiving the scrolling command:
  determining that an edge of the display page is reached, and
  in response to determining that the edge of the display page is reached, maintaining the edge of the display page in a fixed position on the display and graphically tilting the display page inwards to appear hinged along the edge of the display page.

2. The method of claim 1, wherein while receiving the scrolling command, further includes:
  detecting an increase in a duration of the scrolling command; and
  in response to detecting the increase in the duration of the scrolling command, increasing a degree of tilting of the display page inwards.

3. The method of claim 2, wherein while receiving the scrolling command, further includes:
  determining that the duration of the scrolling command is greater than a pre-determined threshold; and
  in response to determining that the duration of the scrolling command is greater than the predetermined threshold, displaying a zoomed out display page.

4. The method of claim 3, wherein the zoomed out display page includes content, and wherein while receiving the scrolling command, further includes:
  inserting one or more identifiers to the content of the zoomed out display page to indicate one or more sections within the content of the zoomed out display page.

5. The method of claim 4, wherein the content of the zoomed out display page includes an alphabetical list, and the identifiers include letters indicating alphabetical sections of the list.

6. The method of claim 1, wherein graphically tilting the display page includes pivoting the display page around the edge of the display page.

7. The method of claim 1, wherein while receiving the scrolling command, further includes: graphically scrolling the display page in the first direction to display a second portion of the display page on the display, and wherein the second portion of the display page includes the edge of the display page.

8. The method of claim 7, wherein in response to determining that the edge of the display page is reached further includes: graphically tilting a remainder of the second portion of the display page inwards, causing display of the first and second portions in a perspective view with the second portion appearing smaller than the first portion.

9. The method of claim 1, further comprising:
  detecting termination of the scrolling command; and
  in response to detecting the termination of the scrolling command, displaying the display page untilted.

10. The method of claim 3, wherein the pre-determined threshold is based on applying one or more historical preferences.

11. An electronic device comprising:
  a display;
  an input interface;
  a memory; and
  a processor coupled with the display, the input interface and the memory, the processor being configured to:
  display a first portion of a display page on the display;
  receive, via the input interface, a scrolling command to scroll the display page in a first direction; and,
  while receiving the scrolling command:
    determine that an edge of the display page is reached, and
    in response to determining that the edge of the display page is reached, maintain the edge of the display page in a fixed position on the display and graphically tilt the display page inwards to appear hinged along the edge of the display page.

12. The electronic device of claim 11, wherein while receiving the scrolling command, further includes:
  detecting an increase in a duration of the scrolling command; and
  in response to detecting the increase in the duration of the scrolling command, increasing a degree of tilting of the display page inwards.

13. The electronic device of claim 12, wherein while receiving the scrolling command, further includes:
  determining that the duration of the scrolling command is greater than a pre-determined threshold; and
  in response to determining that the duration of the scrolling command is greater than the predetermined threshold, displaying a zoomed out display page.

14. The electronic device of claim 13, wherein the zoomed out display page includes content, and is further configured to:
  insert one or more identifiers to the content of the zoomed out display page to indicate one or more sections within the content of the zoomed out display page.

15. The electronic device of claim 14, wherein the content of the zoomed out display page includes an alphabetical list, and the identifiers include letters indicating alphabetical sections of the list.

16. The electronic device of claim 11, wherein graphically tilting the display page includes pivoting the display page around the edge of the display page.

17. The electronic device of claim 11, wherein while receiving the scrolling command, further includes: graphically scrolling the display page in the first direction to display a second portion of the display page on the display, and wherein the second portion of the display page includes the edge of the display page.

18. The electronic device of claim 15, wherein in response to determining that the edge of the display page is reached further includes: graphically tilting a remainder of the second portion of the display page inwards, and wherein the first portion of the display page is displayed tilted inwards.

19. The electronic device of claim 11, further configured to:
  detect termination of the scrolling command; and
  in response to detecting the termination of the scrolling command, displaying the display page untilted.

20. A non-transitory computer readable storage medium comprising computer executable instructions which, when executed, configure a processor to:
  display a first portion of a display page on a display;
  receive, via an input interface, a scrolling command to scroll the display page in a first direction; and,
  while receiving the scrolling command:
    determine that an edge of the display page is reached, and
    in response to determining that the edge of the display page is reached, maintain the edge of the display page in a fixed position on the display and graphically tilt the display page inwards to appear hinged along the edge of the display page.

* * * * *